ABSTRACT OF THE DISCLOSURE

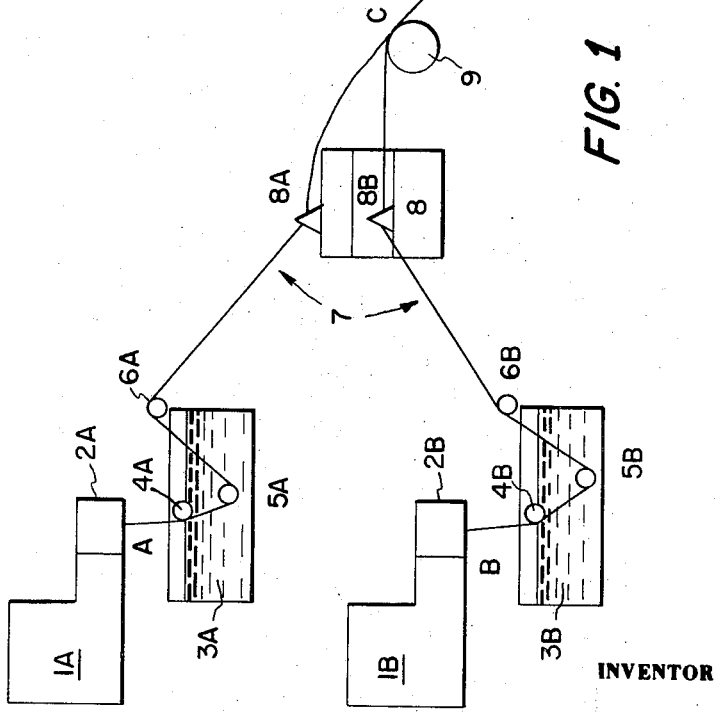
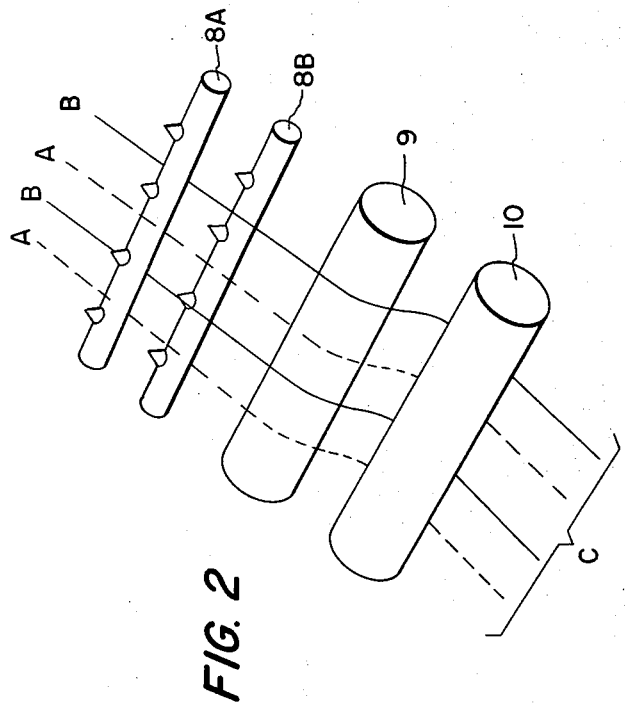
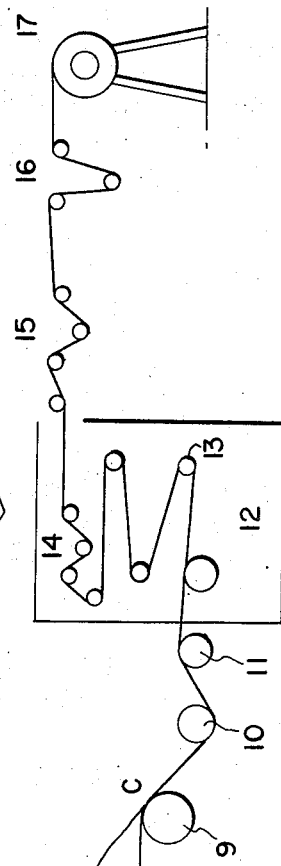
FIG. 2
FIG. 1
INVENTOR
FRANK R. CRAMTON
BY Jones and Lockwood
ATTORNEYS 3,790,655
METHOD FOR COMMINGLING AND ORIENTING COLORED SETS OF THERMOPLASTIC FILAMENTS
Frank Richard Cramton, Burlington, Vt., assignor to E. B. & A. C. Whiting Company, Burlington, Vt.
Filed Mar. 2, 1971, Ser. No. 120,190
Int. Cl. D01d 5/12
U.S. Cl. 264—210 F    5 Claims

Differently colored sets of unoriented thermoplastic filaments are passed along converging paths and then commingled to form a multi-colored filament web. This web is subsequently heated to the orientation temperature of the filaments and then stretched along the longitudinal axis of the web to simultaneously stretch-orient each filament of the multi-colored web.

BACKGROUND OF THE INVENTION

This invention relates to a novel procedure for commingling differently colored sets of unoriented thermoplastic filaments as a preliminary step in the manufacture of a longitudinally stretch-oriented, multi-colored web of filaments, each having the same degree of orientation.

Prior methods for manufacturing mixtures of differently colored, oriented thermoplastic filament sets required the use of a separate production line for each color set. The individual color sets were independently extruded, separately stretch-oriented, and then ultimately collected together, for the first time, as a mixture on a common takeup reel. Since each oriented color set was produced on a separate production line, which was subject to a variance in its extrusion rate and its orientation parameters from each of the other production lines, some snarling of the color sets often occurred on the takeup reel where these sets were collected. Further, because of the variance in each production line, it was difficult to form a uniformly distributed collection of each of the color sets in a hank cut from the takeup reel.

U.S. Pat. No. 3,022,132 to Shaw is exemplary of those prior methods for manufacturing mixtures of differently colored filament sets. In this Shaw patent, three sets of unoriented polystyrene filaments were extruded separately from three extrusion dies and thereafter were gradually cooled to their orientation temperature as each set was carried individually on a separate driven roller assembly. Each filament set was then individually stretch-oriented by a separate tension-applying device to produce three separate sets of oriented monofilaments. Each oriented set was then separately cooled before the three oriented sets were commingled, for the first time, on a common takeup reel. Thus, the process disclosed in U.S. Pat. No. 3,022,132 required the separate formation of oriented sets of differently-colored filaments which were each produced on a separate production line and commingled, for the first time, at a common takeup point after each set had been separately stretch-oriented. However, since each oriented color set was produced on a separate production line, which was subject to a variance in its extrusion rate and its orientation parameters from each of the other production lines, each set of colored filaments of ten had a different rate of linear recovery from the tensile forces applied during the stretch orientation step. Therefore, each color set often arrived at the common takeup reel at a different linear speed and at a different degree of stretch relaxation from that of another color set produced on another production line. As one color set was tightly wound on the takeup roll under a high tension takeup from its production line, simultaneously another color set was loosely wound under a lower tension takeup from another production line. Accordingly, some snarlying of the color sets often occurred on the takeup reel where the oriented sets were first commingled. Further, due to the different degrees of tension takeup for each color set, it was difficult to form a uniformly distributed collection of each of the color set s in a hank cut from the takeup reel.

It is an object of this invention to provide a method for commingling and orienting sets of differently colored thermoplastic filaments without the need for independent production lines to separately orient each filament set. It is another object of this invention to prevent snarling of the filament sets as they are commingled and to enhance the uniform distribution of each of the filament color sets within the final multi-colored filament mixture.

SUMMARY OF THE INVENTION

In accordance with the present invention, two or more differently colored filament sets are separately extruded from independent extruders and through a quench bath having a temperature that is below the orientation temperature of the filaments in each color set. Each extruder produces a filament set having monofilaments of the same color. Generally, all the monofilaments in both sets are made from the same thermoplastic resin or from types of resins that require an identical treatment during orientation. Preferably, all the monofilaments in both sets should have similar dimensions so that the physical properties of all of the monofilaments are similar except for the color difference between the monofilaments of different filament sets. After quenching, the unoriented filament sets are moved along converging paths until they are in a spaced, parallel, overlying position to one another. While the filament sets are in this position, the unoriented monofilaments of each set are separated in a uniformly spaced relation from one another. Subsequently, the differently colored filament sets, each of which now containing spaced monofilaments, are moved from the overlying position to a point of planar convergence where the sets are commingled to form a multi-colored filament web of uniformly color distributed, unoriented monofilaments. This multicolored filament web, now composed of uniformly color distributed monofilaments, is then heated to the orientation temperature of the commingled filaments before a longitudinal tensioning force is applied on the web to orient all of the web filaments simultaneously. Thus, the same degree of longitudinal stretch-orientation is imparted to each of the differently colored filaments of the web. Thereafter, each filament of the web is allowed to relax from the tensile forces of stretch-orientation at the same rate and ultimately the oriented web of multi-colored filaments is collected on ta takeup reel. Since each filament of the web is produced under the same conditions of stretch-orientation, every web filament arrives at the takeup roll at the same speed and at the same degree of relaxation. Consequently, there is substantially no snarling of the web filaments as they are wound about the takeup reel. Accordingly, the uniform filament color distribution of the web formed at the point of planar convergence of the unoriented filament color sets, is maintained as the web is wound about the takeup reel.

In one embodiment, the longitudinally oriented, multi-color filament web of this invention is made by separately extruding two differently colored, thermoplastic filament sets from a first and a second extruder disposed at an angle to each other. The two color sets are then passed through separate quenching media and along a converging path toward a double tiered comb member, each tier of the comb member having a plurality of upstanding tines. The quenched filament set from the first extruder is passed through a lower tier of the comb member and onto an initial roll of a series of snub rolls, while the quenched filament set from the second extruder is passed through an upper tier of the comb member and thereafter commingled with the first set at an interface of the comb member and the initial roll. The upper and lower tiers of the comb member are disposed so that the upstanding tines of both tiers are in a spaced, parallel, overlying position to one another. Accordingly, as the two color sets pass one above the other through the upper and lower tiers, the monofilaments of each set are separated by the tines in each tier while both color sets of spread filaments are maintained in a spaced, parallel, overlying alignment with one another. The two color sets are then passed to a point of planar convergence at the initial roll-comb interface where the spread filaments of both sets are commingled with each other to form a multi-colored filament web. Preferably, the tines of the upper and lower tiers are disposed in a relation to one another such that the filaments passing through the upper tines and the filaments passing through the lower tines are sandwiched between one another at their point of planar convergence. Accordingly, at this convergence point, a multi-colored filament web is formed which has a uniform distribution of both color sets throughout the body of the web.

In order to simultaneously orient each monofilament of the multi-colored web, the web is passed over and under a series of snub rolls and then heat-softened by conducting it through a heating chamber. Within this chamber the web is heat softened while being supported on a series of rolls, the peripheral surface of each roll providing a supporting surface for the monofilaments of the web. During the conveyance of the web through the heating chamber, the monofilaments comprising the web are heated to their orientation temperature and then simultaneously stretched to increase the molecular orientation of the monofilaments along the longitudinal axis of the web. Any amount of stretching will increase the longitudinal molecular orientation of the monofilaments; however, maximum benefits are obtained by stretching the web from about twelve to about fifteen times of its original length. Subsequent to the stretching step, each filament of the web is allowed to relax from the tensile forces of stretch orientation at the same rate. Ultimately, the longitudinally oriented web is cooled to room temperature and collected on a takeup reel. Since each filament of the web is produced under the same conditions of orientation, every web filament arrives at the takeup roll at the same speed and at the same degree of relaxation. Consequently, there is substantially no snarling of the web filaments as they are wound about the takeup reel. Accordingly, the uniform filament color distribution of the web formed at the comb member-initial roll interface is maintained as the web is wound about the reel.

DESCRIPTION OF THE DRAWINGS

In order to describe the invention more specifically, reference is now made to the drawings which illustrate an apparatus for effecting an embodiment of this invention. The apparatus as shown can be used for commingling and orienting monofilament sets of two different colors.

FIG. 1 is a schematic view of a suitable arrangement of apparatus for commingling and orienting two different color sets of monofilaments.

FIG. 2 is a perspective view of the double tiered comb member and the initial snub roll apparatus of this invention.

As shown in the drawing figures, two differently colored, thermoplastic monofilament sets A and B are simultaneously extruded from extruders 1A and 1B. Each extruder produces a filament set having monofilaments of the same color but of a different color than those of the other set. All of the monofilaments in both sets are extruded from the same thermoplastic resin or from types of resins that require an identical treatment during orientation and that relax (shrink) from orientation at an identical rate. This similarity of properties is preferred since the eventual degree of orientation to which each monofilament of both sets is subjected has to be identical so that the product of each extruder can be presented to the final collection reel 17 with each filament traveling at the same speed. Thus, any snarling of the monofilaments at the collection reel is prevented since the filaments arrive at the reel at the same controlled rate of speed and relaxation.

Each of the extruders are provided with die plates 2A and 2B, each plate having filament orifices (not shown) which produce two sets of monofilaments of the same or similar dimensions. The number and size of the filament orifices in each die plate as well as the extrusion pressure behind each die plate are controlled in order to obtain the desired percentage of the differently colored monofilaments of the desired number and size. If it is desired to produce a multi-colored filament web having an equal distribution of monofilaments A and B (50% A-50% B), the number of monofilament orifices in each die plate should be the same so that the same number of monofilaments are issued simultaneously from each die plate. If a different distribution of filaments is desired in the multi-color web, the number of filament orifices may be adjusted so that the desired number of monofilaments from each color set are issued from each die plate. In any event the dimensions of the orifices in each die plate should be similar.

After passing through the die plates 2A and 2B, color sets A and B are drawn through separate quench baths 3A and 3B in order to solidify each monofilament of both sets. Each bath contains a liquid non-solvent for the thermoplastic composition of the monofilaments and each bath has a temperature well below the orientation temperature of the monofilament sets. Both color sets are immersed in the quench baths by rolls 4A, 5A and 4B, 5B for a time sufficient to solidify each monofilament in each set. It is also possible to quench both filament sets in the same quench bath by disposing a common quench bath adjacent to both extruders. Each filament set could then be passed through a different part of the common quench bath and immersed therein by common rollers.

After quenching, the monofilament color sets A and B are transported over rollers 6A, 6B and along a converging path generally designated as 7 toward a double tiered comb member 8. Each tier 8A and 8B of the comb member has a plurality of upstanding tines. The quenched filament set B is passed through the lower tier 8B of the comb member and onto an initial roll 9 of a series of snub rolls 9, 10 and 11. The quenched filament set A is passed through the upper tier 8A of the comb member and commingled with color set B at an interface of the roll 9 and the comb 8. The upper and lower tiers of the comb member are disposed so that the upstanding tines of the upper tier 8A and the upstanding tines of the lower tier 8B are in a spaced, parallel, overlying position to one another. As the color sets A and B pass in parallel paths one above the other through tiers 8A and 8B, the monofilaments of each set are separated by the tines in each tier, while the color sets are still in a spaced, parallel, overlying relationship to one another. The two color sets are then drawn under tension by snub rollers 9, 10 and 11 to a point of planar convergence at the interface of initial snub roll 9 and the comb member 8. At this interface, the spread filaments of both sets are commingled with each other to form a multi-colored filament web C. The linear distribution of the differently colored filaments of the web is controlled by oscillating the upper tines relative to the lower tines or by otherwise disposing the tines of the upper and lower tiers in a relation such that the filaments passing through the upper tines and the filaments passing through the lower tines are sandwiched between one another at their point of planar convergence. Accordingly, at this convergence point, a multi-colored filament web C is formed which has a uniformly linear distribution of both color sets throughout the body of the web.

In order to simultaneously orient each monofilament of the multi-colored web C, this newly formed web is passed over and under the snub roll series 9, 10 and 11 and conducted into a heating chamber 12. Within this heating chamber, the multi-colored web is transported in a sinuous path over a number of rollers 13 which may be heated. Heated air is circulated throughout the chamber 12 and as the web passes therethrough the monofilaments comprising the web are heated simultaneously to their common orientation temperature. Each succeeding roller 13 over which the web passes is driven at a slightly increased speed from that of the proceeding roll so as to prevent the sagging of the monofilaments during their sinuous path. The primary purpose of the sinuous series of driven rolls 13 is to provide a heat exchange relationship between the web and the heated air of the oven so that the monofilaments of the web are simultaneously and uniformly heat softened within the heating chamber.

After leaving the last and uppermost driven roll 13, the web is snubbed by a slow snub roll assembly 14, each roll of which is driven at about the same speed or at a higher speed than that of the preceding roll 13. The web then passes through a fast snub roll assembly 15 provided just outside the oven 12 and operated at a speed of at least 12 times and preferably 15 times the speed of snub roll assembly 14. Thus, the monofilaments of the web are stretched uniaxially and given a high degree of longitudinal orientation in the order of from twelve to fifteen times their original length. Since the monofilaments of the web have similar orientation properties as explained above, the speed of all the monofilaments of the web is identical during the stretching of the web between slow snub assembly 14 and fast snub assembly 15. Accordingly, all the monofilaments of the web are uniformly and simultaneously oriented along their longitudinal axis.

Following the stretch orientation step, each monofilament of the web may be allowed to relax from the tensile forces of orientation by sagging the web between relaxation rollers 16 which operate at a slower speed than roll 15. Since each monofilament of the web has a similar degree of orientation, each monofilament relaxes from the tensile forces of orientation at the same rate. The relaxation rollers also serve to slow the linear speed of the web, permitting an easier alignment of the web on the takeup reel 17.

After relaxation, the web may be quenched and crimped, but in any event, the longitudinally oriented monofilaments of the multi-colored web are collected on a takeup reel 17 from which multi-colored filament hanks may be subsequently cut. Since the two sets of extruded monofilaments have been previously commingled in a uniform distribution at the initial roll comb member interface and remain uniformly distributed throughout the orientation procedure, a uniform distribution of commingled monofilaments is collected on the takeup reel. Further, since all the monofilaments arrive at the takeup reel traveling at the same speed and at the same degree of relaxation, the monofilaments are cleanly wound about the reel and do not snarl thereon.

Although the drawing figures and the foregoing example are limited to the production of a two-colored, oriented web, the process of this invention is not so limited. By providing for additional extruders and additional comb tiers, three or more colors of unoriented filaments may be formed into the multi-colored web at the comb-initial roller interface. Further, the method of this invention is not necessarily limited to the use of a tiered comb member but can be effected by any other means having a similar function such as an aligning device comprising tiers of perforated, hollow cylindrical rods spaced in an overlying, parallel relationship to one another.

What is claimed is:

1. A process for the simultaneous orientation of at least two differently colored, thermoplastic filament sets, wherein all of the filaments in all of the sets exhibit substantially identical physical properties which require substantially identical treatment during orientation to avoid tangling and snarling, comprising the steps of:
    (a) melt extruding at least two sets of differently colored, thermoplastic monofilaments, all of said filaments in said sets having substantially similar dimensions and physical properties, except for said color difference, and all of said filaments requiring substantially identical treatment during orientation,
    (b) moving the melt extruded sets along converging paths to a spaced convergence point where said sets are in an overlying and parallel position to one another,
    (c) separating the monofilaments of each set in a substantially uniformly spaced relationship to each other at said point of spaced convergence,
    (d) moving said sets of separated monofilaments along overlying paths beyond said point of spaced convergence and toward a point of planar convergence,
    (e) commingling said sets at a common point of the planar convergence to form a multi-colored filament web of unoriented filaments,
    (f) heating said filament web to the orientation temperature thereof, thereby subjecting all of the unoriented filaments to the same temperature conditions simultaneously, and
    (g) applying an orientation tensioning force to said web to orient all of the differently colored monofilaments of the web simultaneously under substantially identical conditions for each filament.

2. The process of claim 1 in which each melt extruded set of the differently colored monofilaments is quenched in a separate quench bath as the extruded set are moved along converging paths.

3. The process of claim 1 in which the oriented filaments of the web are allowed to relax from the tensile forces of orientation and are thereafter collected on a takeup reel.

4. A process for the manufacture of a multicolored filament web of uniformly distributed filament color, comprising the steps of:
    (a) separately extruding a plurality of differently colored, thermoplastic filaments sets, the filaments of each set having substantially similar dimensions and physical characteristics and requiring substantially identical treatment during orientation to avoid tangling and snarling,
    (b) quenching the extruded sets to a temperature below that of the orientation temperature of the sets,
    (c) moving the extruded sets along converging paths to a spaced convergence point where said sets are in an overlying and parallel position to one another,
    (d) separating the monofilaments of each set in a substantially uniformly spaced relationship to each other at said point of spaced convergence,
    (e) commingling said sets at a common point of planar convergence to form a multi-filament web of uniformly distributed colored filaments,
    (f) heating said filament web to the orientation temperature thereof, thereby subjecting all of said filaments in said web to the same temperature conditions,
    (g) applying an orientation tensioning force to said web to orient all of the differently colored monofilaments of the web simultaneously, and
    (h) collecting the web.

5. The process of claim 4 in which the oriented monofilaments of the web are allowed to relax from the tensile forces of orientation before the web is collected.

References Cited

UNITED STATES PATENTS

| | | | |
|---|---|---|---|
| 3,402,227 | 9/1968 | Knee | 264—210 F |
| 3,481,558 | 12/1969 | Davies et al. | 264—210 F |
| 3,555,808 | 1/1971 | Gutmann | 264—210 F |
| 3,593,513 | 7/1971 | Reese | 264—210 F |
| 1,975,153 | 10/1934 | Jacquet | 117—52 |
| 2,262,871 | 11/1941 | Whitehead | 264—103 |
| 2,289,568 | 7/1942 | Bloch | 264—103 |
| 2,398,729 | 4/1946 | Taylor et al. | 264—171 |
| 2,461,094 | 2/1949 | Taylor | 264—103 |
| 3,022,132 | 2/1962 | Shaw | 264—297 |
| 3,061,998 | 11/1962 | Bloch | 264—103 |
| 3,209,402 | 10/1965 | Riley et al. | 264—171 |
| 3,273,328 | 9/1966 | Bloch | 264—103 |
| 3,460,336 | 8/1969 | Collingwood et al. | 264—103 |

OTHER REFERENCES

Defensive Publication No. 840,133, November 1969, Yantz et al., Class 264—103.

JAY H. WOO, Primary Examiner

U.S. Cl. X.R.

57—140 BY, 157 S; 264—78, 103

UNITED STATES PATENT OFFICE
CERTIFICATE OF CORRECTION

Patent No. 3,790,655     Dated February 5, 1974

Inventor(s) Frank Richard Cramton

It is certified that error appears in the above-identified patent and that said Letters Patent are hereby corrected as shown below:

Claim 2, line 3, "set" should be --sets--.

Signed and sealed this 21st day of May 1974.

(SEAL)
Attest:

EDWARD M. FLETCHER, JR.
Attesting Officer

C. MARSHALL DANN
Commissioner of Patents